United States Patent
Bertrand et al.

(10) Patent No.: US 7,995,640 B2
(45) Date of Patent: Aug. 9, 2011

(54) DYNAMIC INTERPOLATION LOCATION

(75) Inventors: Pierre Bertrand, Antibes (FR); David J. Hoyle, Sugar Land, TX (US); Eric Biscondi, Opio (FR)

(73) Assignee: Texas Instruments Incorporated, Dallas, TX (US)

( * ) Notice: Subject to any disclaimer, the term of this patent is extended or adjusted under 35 U.S.C. 154(b) by 816 days.

(21) Appl. No.: 11/931,906

(22) Filed: Oct. 31, 2007

(65) Prior Publication Data

US 2008/0267260 A1    Oct. 30, 2008

(30) Foreign Application Priority Data

Apr. 30, 2007   (EP) ..................................... 07290539

(51) Int. Cl.
*H04B 1/00* (2006.01)
(52) U.S. Cl. ........................................................ 375/148
(58) Field of Classification Search ................... 375/148
See application file for complete search history.

(56) References Cited

U.S. PATENT DOCUMENTS

| | | | |
|---|---|---|---|
| 6,560,272 B1 * | 5/2003 | Komatsu | 375/147 |
| 6,879,623 B2 * | 4/2005 | Agami et al. | 375/140 |
| 2002/0196754 A1 * | 12/2002 | Lugil et al. | 370/335 |
| 2005/0169353 A1 * | 8/2005 | An et al. | 375/147 |

* cited by examiner

*Primary Examiner* — Juan A Torres
(74) *Attorney, Agent, or Firm* — Ronald O. Neerings; Wade James Brady, III; Frederick J. Telecky, Jr.

(57) ABSTRACT

Apparatus and method for optimizing interpolation in the despreader data-path of a wireless telecommunications network employing Code Division Multiple Access (CDMA) technology. A base station dynamically evaluates its configuration to determine an interpolator location. The location of the interpolator in a despreader data-path is dynamically selected. A received signal is interpolated. The despread received signals are combined, and further processing is applied to the combined signal. To enhance system performance, the interpolator may, be located at least to perform chip-sample interpolation per antenna stream at chip rate, chip-sample interpolation per user at chip rate, or symbol-sample interpolation per user at sub-symbol rate.

24 Claims, 6 Drawing Sheets

DYNAMIC INTERPOLATION LOCATION

CROSS-REFERENCE TO RELATED APPLICATIONS

The present application claims priority to and incorporates by reference European Patent Application No. 07290539.1, filed on Apr. 30, 2007.

BACKGROUND

Third generation ("3G") mobile communication systems, such as cellular telephone systems, predominantly employ Code Division Multiple Access ("CDMA") methods. CDMA is a variety of direct sequence spread spectrum communications. A CDMA signal occupies a bandwidth much greater than is necessary to send the information carried by the signal, and as a result possesses a measure of interference immunity and multi-user access capability. CDMA uses unique pseudo-noise ("PN") codes, also known as spreading codes, to increase the bandwidth, or spread, the baseband data before transmission. The PN code sequences are produced at a much higher rate than the baseband data and different codes are applied to each user's data within a cell. The bits of a spreading code are known as "chips" to distinguish them from data bits. The ratio of the chipping rate to the baseband data rate is known as the spreading factor. The PN codes assigned to different users within a cell are selected to minimize cross-correlation between the codes. This allows the signal receiver to extract a user's data from the aggregate received signal by correlating the received signal against the spreading code assigned the user. The process of correlating received signal with a known spreading code is called despreading.

In practical applications of a mobile communications system, transmissions between devices, for example between a mobile station, also known as a mobile terminal, a user equipment ("UE"), etc., and a base station, also known as a base transceiver station, a fixed terminal, a Node B, etc., encounter a variety of reflective surfaces (buildings, vehicles, etc.). These surfaces reflect a transmitted signal causing multiple copies of the signal to arrive at the receiver at different times and with varying amplitudes. Rather than attempting to suppress the multi-path signals, CDMA systems use the multi-path signals to improve receiver performance using rake demodulation.

Rake demodulation comprises separately despreading the different resolvable multi-paths, or "fingers," of a CDMA radio link, and constructively combining them to produce a signal having improved signal-to-noise ratio. A rake receiver performs finger despreading by correlating a given antenna sample stream with the channel's PN code shifted by the delays identified for each finger. Antenna sample interpolation is required in CDMA receivers to enable sufficient accuracy in the rake receiver. The interpolator may be located in a fixed position in the base station despreader data-path in order to minimize the cost of the most popular base station configurations. Because a CDMA base station must address a wide range of system user/cell/traffic configurations, fixing the location of the interpolator results in inefficient implementation of some configurations.

SUMMARY

Accordingly, various techniques are herein disclosed for dynamically locating an interpolator in a despreader data-path of a rake receiver. Dynamically locating an interpolator refers to determining the position of an interpolator in the despreader data-path while the receiver is in operation. In accordance with at least some embodiments, a method includes evaluating dynamically a system configuration to determine an interpolator location and selecting the location of an interpolator in a despreader data-path. A received signal is interpolated to increase the sample rate of the signal. Despread received signals are combined. The combined signal is further processed and provided to a user.

In other embodiments, an apparatus includes a despreader, an interpolator coupled to the despreader, and an interpolation location controller coupled to the interpolator. The despreader despreads a received spread spectrum signal. The interpolator interpolates a received data stream to increase the sample rate of the data stream. The interpolation location controller determines a location for the interpolator in the despreader data-path.

In yet other embodiments, apparatus includes a processor and an interpolator software system configured to execute on the processor. The interpolator software system comprises an interpolation location controller and an interpolator. The interpolation location controller determines a location for the interpolator in a despreader data-path. The interpolator interpolates a received data stream to increase the sample rate of the data stream.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct wired or wireless connection. Thus, if a first component couples to a second component, that connection may be through a direct connection, or through an indirect connection via other components and connections. The term "system" refers to a collection of two or more hardware and/or software components, and may be used to refer to an electronic device or devices, or a sub-system thereof. Further, the term "software" includes any executable code capable of running on a processor, regardless of the media used to store the software. Thus, code stored in non-volatile memory, and sometimes referred to as "embedded firmware," is included within the definition of software.

Throughout this disclosure, the term "Code Division Multiple Access" ("CDMA") is used to refer to some categories of third generation ("3G") base stations, networks, and more generally, systems. The term, as used herein, thus refers to base stations, networks and systems compliant with CDMA, 3GPP W-CDMA, and TD-SCDMA telecommunication standards. However, embodiments of the invention have wide-ranging application, and are therefore not precluded from use with other standards.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed present disclosure to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for dynamically locating an interpolator in a despreader data-path of a rake receiver. That is, determining, as the receiver operates, where an interpolator should be placed among the various processing steps performed to accomplish despreading. Embodiments of the disclosed invention may be used to optimize rake demodulation in a CDMA base station.

Because the one chip time granularity of the PN codes used to spread and despread a data stream provides insufficient accuracy to extract multi-path signals, a finer path delay resolution is obtained by interpolating the received data stream. At least three options exist for performing the interpolation:

1) Prior to despreading, the chip-samples of the antenna streams may be interpolated at the chip rate;
2) Prior to despreading, the chip-samples required for each user may be interpolated at the chip rate; and
3) Subsequent to despreading, the symbol samples may be interpolated per user at a (sub) symbol rate.

Unfortunately, no one of the above listed options is optimal for the wide range of user/cell/traffic conditions encountered in 3G CDMA networks; rather, each of the above options may be preferred depending on the number of users, the physical channel type received, and other factors. Embodiments of the present disclosure dynamically evaluate the configuration of the wireless network and enable interpolation at the preferred despread data-path location. As will be recognized by those of skill in the art, embodiments of the invention are operable with a wide variety of interpolation and upsampling algorithms, thus, the invention is not limited to any particular algorithm.

Figure 1:
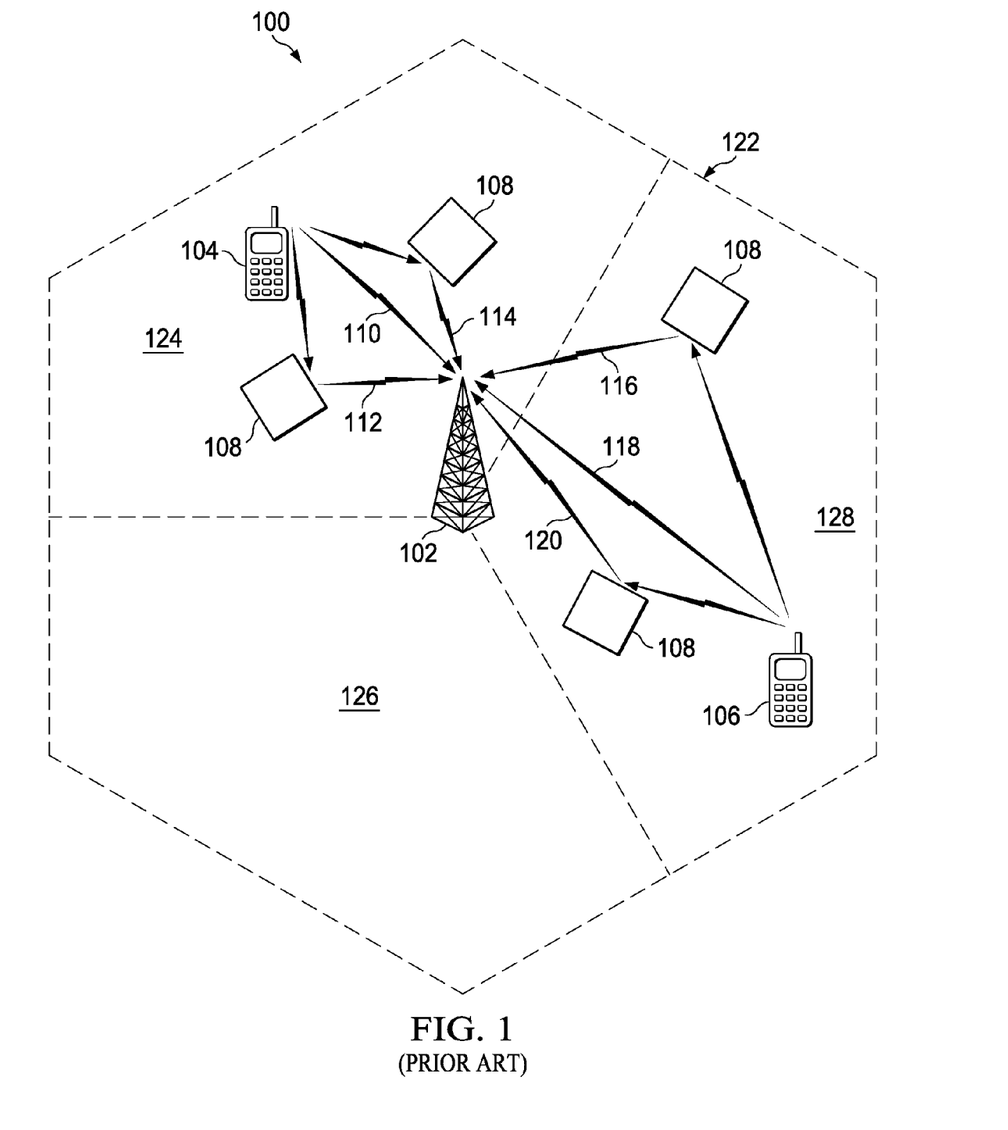
FIG. 1 shows an illustrative wireless network in accordance with embodiments of the invention.

FIG. 1 shows an illustrative wireless network 100. The illustrative telecommunications network 100 includes a single base station 102, though in operation, a wireless network may include more base stations. The base station 102 is operable over the illustrated coverage area 122 which, in this example, is subdivided into three sectors 124, 126, 128. In practice, a base station's coverage area may be subdivided into more or fewer sectors. Two mobile terminals 104, 106 are illustrated within the coverage area 122 of base station 102. An operating wireless network may include one or more mobile terminals.

The mobile terminals 104, 106 communicate with base station 102 using a variety of up-link channels and protocols. For example, on a Universal Mobile Telecommunications System ("UMTS") network, the mobile terminal 104 may use the High Speed Uplink Packet Access ("HSUPA") protocol to stream data to the base station 102. When a mobile terminal 104, 106 is surrounded by obstacles 108, its transmissions may be reflected creating multiple paths between the mobile terminal and the base station 102. Consequently, multiple time-delayed and amplitude variant copies of the transmission arrive at the base station. In FIG. 1, mobile terminal 104 transmissions are reflected by obstacles 108 and are received by base station 102 as signals 110, 112, and 114. Mobile terminal 106 transmissions are reflected by obstacles 108 and are received by base station 102 as signals 116, 118, and 120.

The wireless network 100 employs CDMA technology, and therefore the base station 102 preferably enhances the signal-to-noise ratio of received signals by operation of an included rake receiver to despread and constructively combine the multi-path signals 110, 112, 114 received from mobile terminal 104. To enable sufficient accuracy in the rake receiver, sample interpolation is applied to increase the effective sampling rate of the received data stream. Therefore, the rake receiver included in base station 102 also preferably includes dynamic interpolation location in the despreader data-path, as disclosed herein, to enhance base station 102 operations by dynamically moving the interpolator to the most effective location based on system configuration. Dynamic interpolator location refers to determining the position of an interpolator in the despreader data-path while the receiver is in operation and based on current operational conditions. By dynamically placing the interpolator in a preferred location in the despreader data-path, the base station 102 may free resources enabling base station 102 to enhance processing of received data, or to increase the number of mobile terminals the base station 102 can otherwise service. Thus, a preferred interpolator location may be a location that allows the base station 102 to produce the samples necessary to effectuate rake demodulation using the fewest resources (e.g. processor cycles, if a processor performs the interpolation).

Figure 2:
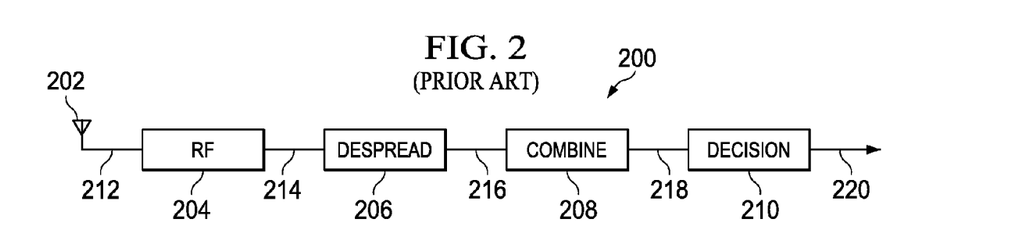
FIG. 2 shows an illustrative block diagram of a CDMA receiver in accordance with embodiments of the invention.

FIG. 2 shows an illustrative block diagram of a CDMA rake receiver in accordance with embodiments of the invention. The receiver 200 includes antenna 202 to receive transmitted radio frequency (RF) signals. In practice, antenna 202 may comprise a plurality of antennas. Radio frequency signals 212 received by antenna 202 are directed to RF component 204 where the signals 212 are down-converted and digitized to produce baseband signals 214. Baseband signals 214 may be sampled, for example, at the chip rate or at twice the chip rate. Baseband signals 214 are directed to despreader 206. Despreader 206 correlates the baseband signals 214 with the spreading codes known to be used by the mobile terminals 104, 106. Despread multi-path signals 216 are directed to combiner 208 where the signals are constructively combined using, for example, maximum ratio combining, to improve the signal-to-noise ratio of the combined signal 218. Combined signal 218 is further processed by decision block 210 where symbol decisions are made using, for example, soft decision Viterbi decoding. Symbol estimates 220 include voice and other data signals that are provided to users.

Figure 3:
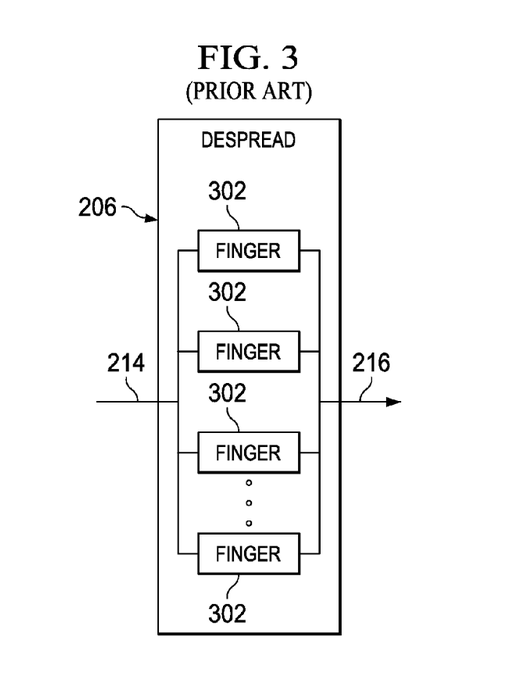
FIG. 3 shows an illustrative block diagram of a multi-finger rake receiver in accordance with embodiments of the invention.

FIG. 3 further illustrates the rake despreader 206 as comprising a plurality of rake fingers 302 in accordance with embodiments of the invention. Each rake finger 302 despreads a signal (e.g. FIG. 1 110, 112, or 114) resulting from a travel path between the transmitting unit 104 and the receiving unit 102. As indicated by the plurality of fingers 302, a number of the received multi-path signals 110, 112, 114, resulting from reflections of a mobile terminal transmission, will be despread for subsequent combining. Unfortunately, the sampling interval of baseband signals 214 may be too large to allow accurate extraction of each multi-path. Therefore, to effectuate rake demodulation, the sample interval of the baseband signal 214 is decreased by interpolation. For example, if the baseband signal 214 was sampled at twice the chip rate, then 4× interpolation may be applied to produce a finer granularity (e.g., ⅛ chip) for rake demodulation. The interpolation may be performed at a variety of points in the despreader data-path. However, no single location is optimal when considering the wide range of user numbers, cell configurations, traffic volumes, and other factors encountered in a CDMA wireless network. Thus, the rake despreader 206 preferably includes dynamic location of an interpolator to enhance receiver operation across the broad range of operational conditions confronting a CDMA receiver. As described below, preferred interpolator locations in the despreader data-path include:

1) a location where all the antenna streams may be interpolated at the chip rate;
2) a location after the antenna streams relevant to a user have been identified, and where the relevant antenna streams may be interpolated to produce the samples needed for rake processing of the user signal; and
3) a location after despreading where (sub) symbols produced by a despreader may be interpolated at a (sub) symbol rate.

A preferred location for interpolation may be determined by evaluating the amount of system resources required to provide the necessary samples at each possible interpolator location in the system configuration under consideration. Such optimization may be especially valuable to maximize resource utilization in systems performing interpolation in software.

Additionally, interpolators in multiple locations may be operated simultaneously to enhance receiver operation. For example, it may be preferable to interpolate voice user signals per user at (sub) symbol rate while interpolating data user signals (e.g. High Speed Downlink Packet Access) per user at chip rate.

Figure 4:
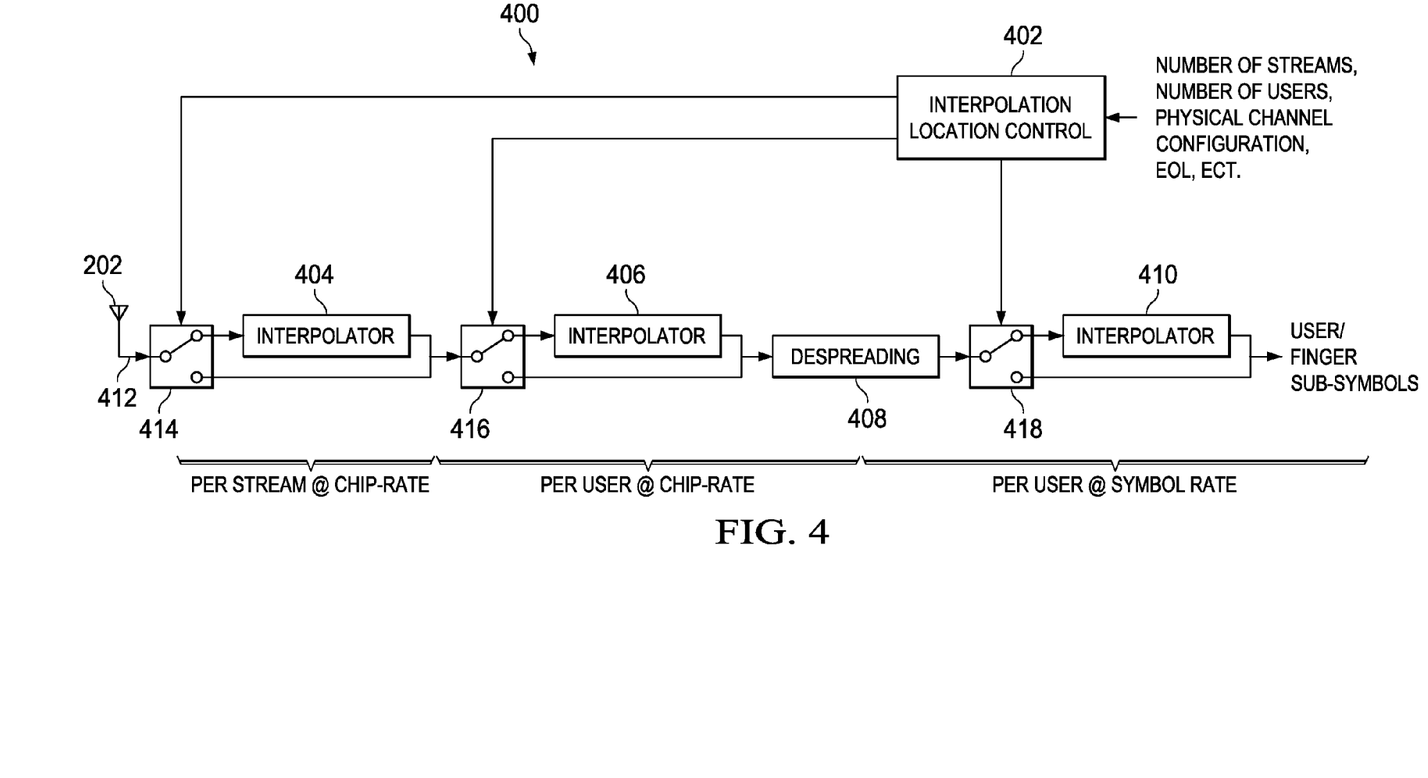
FIG. 4 shows a block diagram of a rake receiver configured for dynamic interpolator location in accordance with various preferred embodiments of the invention.

FIG. 4 shows a block diagram of a rake receiver configured for dynamic interpolator location in accordance with various preferred embodiments of the invention. The rake receiver 400 includes interpolation location control module 402 coupled to signal routing elements 414, 416, 418. One or more interpolators 404, 406, 410 are provided to upsample the received signal as needed to facilitate accurate despreading. Note that while interpolators 404, 406, and 410 are illustrated as separate modules, the illustration is intended only to show that interpolation may be performed in a variety of locations including these three locations. The functionality of the interpolators may be centrally located or distributed, implemented as software executing on a processor or as fixed or programmable hardware.

As the rake receiver 400 operates, interpolation location control module 402 processes the various and changing parameters affecting the selection of a preferred interpolator location and based on those parameters enables interpolation at one or more selected points in the despreader data-path. Parameters affecting preferred interpolator location comprise: the number of antenna streams that must be processed, the number of users being serviced, the network's physical channel configuration, whether early or on-time or late delay tracking is enabled, the number of fingers to be processed, the spreading factor of the received signals, and other factors.

Signal 412 represents signal received by one or more antennas 202, down-converted from radio frequency to baseband and digitized. If selected as the preferred interpolator location, interpolator 404 performs interpolation at the chip rate of each antenna data stream. Thus, if ⅛ chip sampling is required, interpolator 404 outputs the additional samples to produce 8 samples per chip for each antenna stream of the possibly six or twelve antennas 202. From these samples despreader 408 selects the best sample phase for despreading each finger.

If preferred, interpolation location control module 402 selects interpolator 406 to generate samples for each finger of each user. That is, interpolator 406 only produces for each user the samples of interest from the antenna streams of interest. Moreover, in this interpolation mode, samples corresponding to all n fingers of each user need not be separately produced because, if all paths will necessarily use a different PN code offset for despreading, the fingers may use the same sub-chip sample stream. Thus the effective number of fingers may be defined, in at least some embodiments, as:

$$n_{\mathit{eff}} = \sum_{k=1}^{n} k \times p(n, g, k), \quad (1)$$

where n is the number of fingers per user, and p(n, g, k) is the probability that all n fingers fall into k different sub-chip slots out of g, the total number of sub-chip slots. Here g equals the Rake receiver chip sample granularity requirement (e.g., 8 samples per chip) times the number of antennas considered per user (e.g., 2 antennas per user).

The calculation of p(n, g, k) assumes that all fingers are independent and identically distributed, and follow a distribution over the g sub-chip slots with probability 1/g to fall within a given sub-chip slot s. The calculation is derived by considering all possible sequences built from the binary choice for each finger from 1 to n such that the finger falls in one of the same i slots as previous fingers (with probability i/g) or in a new slot (with probability 1−i/g). Generalizing to any n, k, g yields:

$$p(n, g, k) = \frac{\prod_{m=1}^{k-1}\left(1 - \frac{m}{g}\right)}{g^{n-k}} \sum_{q_1=1}^{k} \sum_{q_2=q_1}^{k} \cdots \sum_{q_{k-1}=q_{k-2}}^{k} q_1 q_2 \cdots q_{k-1} \sum_{l=q_{k-1}}^{k} l \quad (2)$$

$$= g^{k-n} \prod_{m=1}^{k-1}\left(1 - \frac{m}{g}\right) \sum_{q_1=1}^{k} \sum_{q_2=q_1}^{k} \cdots \sum_{q_{k-1}=q_{k-2}}^{k} q_1 q_2 \cdots$$

$$q_{k-1} \frac{k(k+1) - q_{k-1}(q_{k-1} - 1)}{2}.$$

Figure 5:
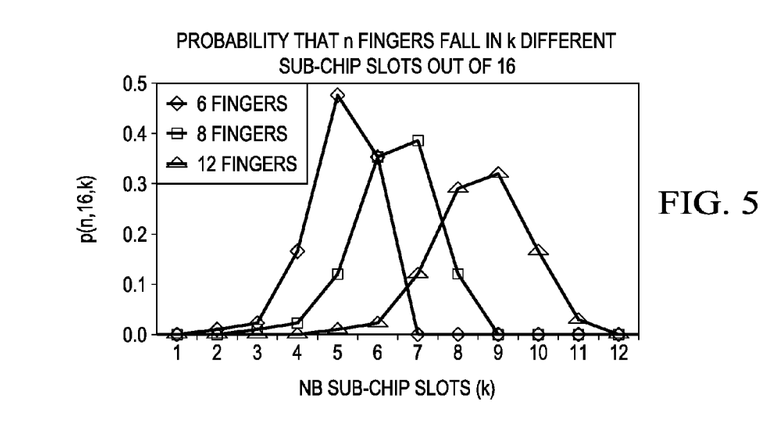
FIG. 5 shows a plot illustrating the probability that n fingers fall into k different sub-chip slots out of 16 total sub-chip slots.

FIG. 5 plots equation (2), illustrating the probability that n fingers fall into k different sub-chip slots out of g total sub-chip slots where g=16 total sub-chip slots and n=6, 8, or 12 fingers.

One simple example of a configuration in which per user chip level interpolation is preferred occurs when users are situated in a single sector of a base station's coverage area. In that situation, other embodiments may expend resources interpolating antenna streams supporting no users, or generating intra-stream samples that the despreader does not need.

Figure 6:
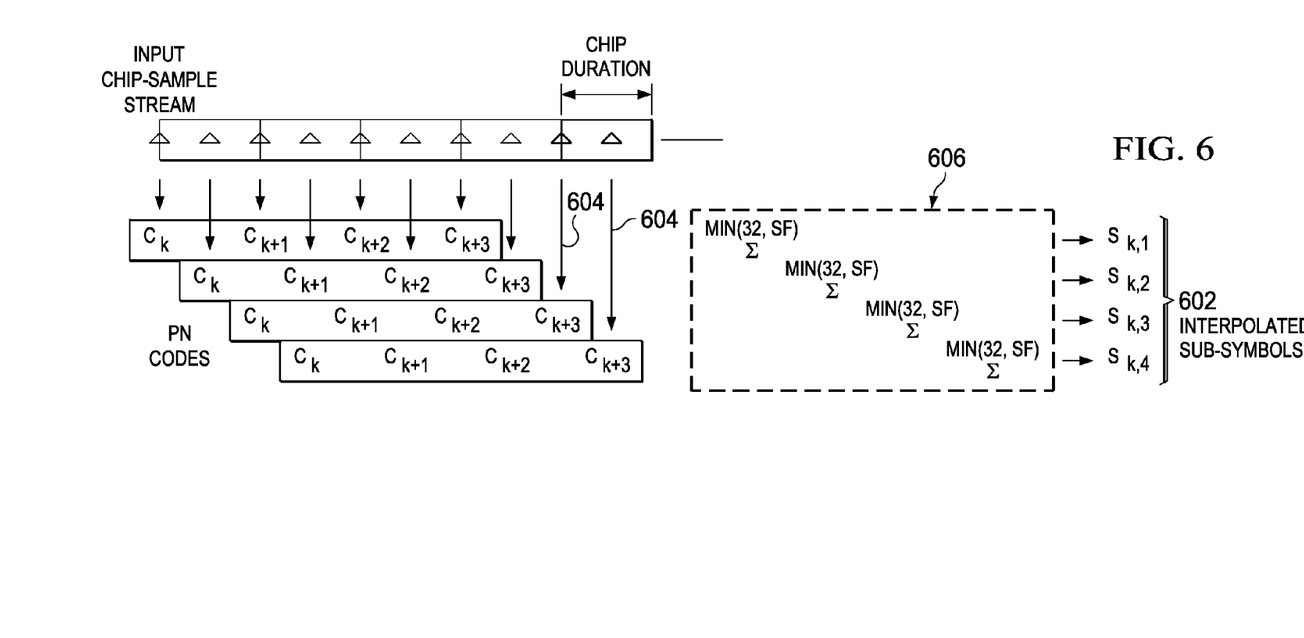
FIG. 6 shows a diagram of a post-despreading interpolation method in accordance with various embodiments of the invention.

Interpolator 410 performs post-despreading interpolation, and may be selected by interpolation location control module 402 if sub-symbol rate interpolation is preferred. FIG. 6 illustrates the post-despreading interpolation method on a channel employing a spreading factor of 4. The correlator despreads as many (sub) symbols 602 ($S_{k,1}$-$S_{k,4}$) as there are interpolator taps (e.g., 4 in this case). The term "sub-symbol" or "(sub) symbol," as used herein, indicates that, depending on the spreading factor and the despreader implementation, a despreader may produce a complete symbol or a portion of a symbol, a sub-symbol that may be further processed to produce a complete symbol.

The correlations of FIG. 6 are one-half chip apart 604 and the interpolation is performed on the resulting (sub) symbols. As shown, the summations 606 producing the (sub) symbols are performed over the minimum of the spreading factor and an implementation specific maximum number of chips. While FIG. 6 illustrates 32 as an exemplary maximum, the present disclosure is intended to encompass any maximum number of chips used in despreading. Further, some despreader embodiments, for example as illustrated in FIG. 6, may shift the received samples over the same PN sequence; other embodiments may shift the PN sequence over the same sample sequence. The invention of the present disclosure is not limited to particular despreader embodiments and is intended to encompass all such despreader embodiments.

Figure 7:
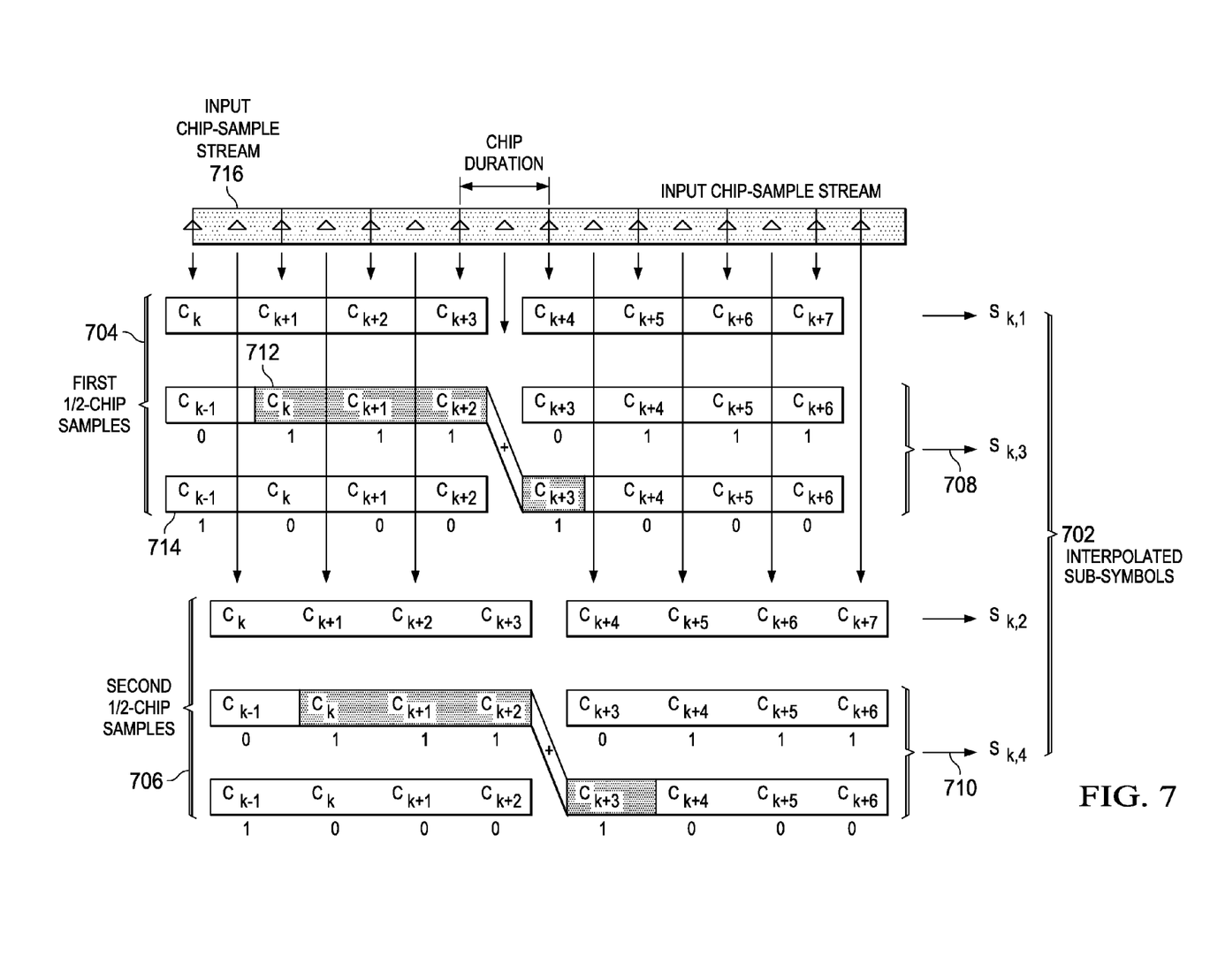
FIG. 7 shows a diagram of a (sub) sample computation method in accordance with at least some preferred embodiments of the invention.

FIG. 7 illustrates (sub) symbol computation for post-despreading interpolation in accordance with at least some preferred embodiments of the invention. As in FIG. 6, for use with a four tap interpolator, the correlator of FIG. 7 despreads four (sub) symbols ($S_{k,1}$-$S_{k,4}$) 702. The despreader performing the illustrated computation is capable of simultaneously correlating different PN sequences against a sample stream 716. The operations depicted comprise a pair of despreading operations 704, 706 each including three sub-operations. The first of the pair of operations 704 despreads the first one-half chip samples to produce $S_{k,1}$ and $S_{k,3}$. The second operation 706 of the pair despreads the second one-half chip samples to produce $S_{k,2}$ and $S_{k,4}$. (Sub) symbols $S_{k,3}$ 708 and $S_{k,4}$ 710 are computed by shifting the PN code against the chip samples. As shown, the operations producing (sub) symbols $S_{k,3}$ 708 and $S_{k,4}$ 710 overlap sequential despreading operations. At least some preferred embodiments of the invention compute $S_{k,3}$ 708 and $S_{k,4}$ 710 by performing two parallel despreads 712, 714 using the same PN sequence weighted to allow the sum of the results of the two despreads 712, 714 to produce a (sub) symbol over two successive despreading operations. For example, in FIG. 7, a first despread result 712 is weighted by 0111 and a second despread result 714 is weighted by 1000. As shown, the sum of these despread results over two sequential despreads may produce a (sub) symbol, $S_{k,3}$ 708.

Figure 8:
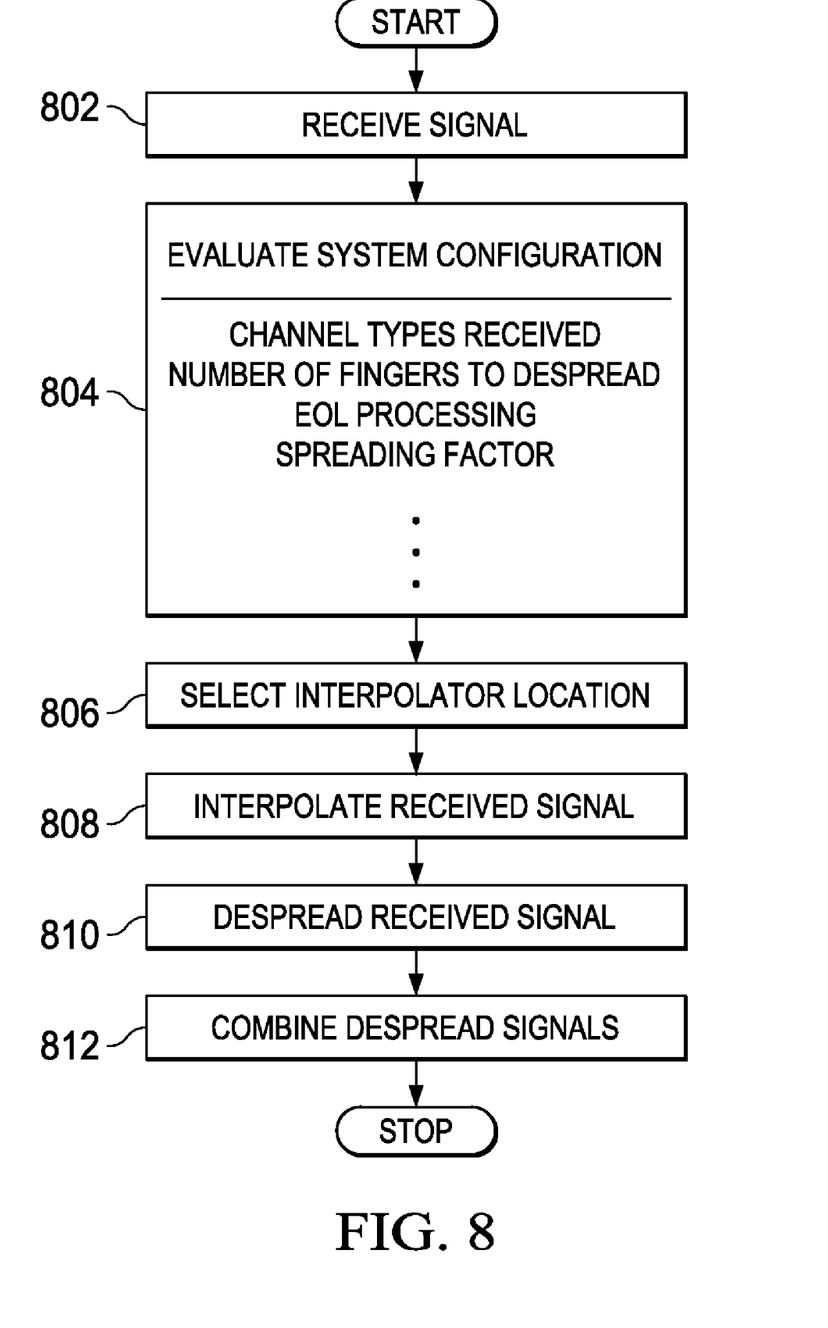
FIG. 8 shows a flow diagram of a method for dynamically locating an interpolator in the despread data-path of a rake receiver in accordance with preferred embodiments of the invention.

FIG. 8 shows a flow diagram of an illustrative method for dynamically locating an interpolator in the despread data-path of a rake receiver in accordance with preferred embodiments of the invention. Though depicted sequentially as a matter of convenience, at least some of the actions shown can be performed in a different order and/or performed in parallel. In block 802, the rake receiver 400 is receiving spread spectrum radio frequency signals. The received radio frequency signals are down-converted to baseband and digitized.

In block 804, the configuration of the wireless system is evaluated to select the preferred location for an interpolator. A variety of parameters are considered including: the spreading factor of received channels, whether early-ontime-late finger tracking is enabled, the number of fingers to be despread, the channel types being received, the number of users transmitting, etc. After the relevant parameters are evaluated, an interpolator location is selected in block 806. Chip-rate interpolation per antenna stream, chip-rate interpolation per user, and (sub) symbol-rate interpolation per user have been described in the present disclosure; however, the invention is not so limited and is applicable to all dynamically selectable interpolators in the despreader data-path.

In block 808 the received baseband signal is interpolated to increase its sample rate for improved despreading and combining.

In block 810 the received baseband signal is despread. As indicated above, the location of the interpolator in the despreader data-path depends on a variety of system configuration parameters, and therefore interpolation may be performed either before or after despreading.

The despread multi-path signals are combined, in block 812, to improve the signal-to-noise ratio of the resulting signal. Symbol decisions are made based on the combined signal, and various voice and/or data signals are supplied to users after further processing.

While the selection of a preferred interpolator location depends, at least in part, on system implementation, partial results of an analysis of achievable system gains using a Texas Instruments TMS320TCI6488 DSP to implement a rake receiver having dynamically locatable interpolation in accordance with embodiments of the invention are included below. Table 1 illustrates the gains possible by selecting a preferred interpolator location. Three and six sector cell configurations were considered using HSUPA with a pair of spread factor 4 codes. As indicated below, per-stream at chip-rate interpolation provides the best density for 3 sectors but performs poorly with six sectors. Interpolation per user at the (sub) symbol rate is preferred with six sectors. The resulting channel density gain for despreading with dynamic interpolation location, rather than a fixed location interpolator, is as high as 2× for three sectors and 9× for six sectors.

TABLE 1

HSUPA - E-DCH 2xSF4: 960 kbps

| | Max number of users | |
| --- | --- | --- |
| | 3 sectors | 6 sectors |
| Per stream | 12 | 1 |
| Per user at chip rate | 6 | 6 |
| Per user at (sub) symbol rate | 9 | 9 |
| Gain from flexible interpolation location | 2x | 9x |

While illustrative embodiments of this present disclosure have been shown and described, modifications thereof can be made by one skilled in the art without departing from the spirit or teaching of this present disclosure. The embodiments described herein are illustrative and are not limiting. Many variations and modifications of the system and apparatus are possible and are within the scope of the present disclosure. Accordingly, the scope of protection is not limited to the embodiments described herein, but is only limited by the claims which follow, the scope of which shall include all equivalents of the subject matter of the claims.

What is claimed is:

1. A method comprising:
  evaluating dynamically in an electronic system a configuration to determine an interpolator location;

selecting dynamically the location of an interpolator in a despreader data-path; interpolating a received signal; and combining despread received signals and further processing the combined signal.

2. The method of claim 1, further comprising performing a chip-sample interpolation per antenna stream at a chip rate.

3. The method of claim 1, further comprising performing a chip-sample interpolation per user at a chip rate.

4. The method of claim 1, further comprising performing symbol-sample interpolation per user at a sub-symbol rate.

5. The method of claim 1, further comprising determining an interpolator location by considering a factor selected from the group consisting of number of users being serviced, channel type being received, the number of fingers to be despread, early-ontime-late processing, and spreading factor of received signal.

6. The method of claim 1, further comprising increasing the user capacity of a rake receiver by concurrently operating interpolators in a plurality of despreader data-path locations.

7. The method of claim 1, further comprising increasing the user capacity of a base station by dynamically locating the interpolator in the despreader data-path.

8. The method of claim 1, further comprising:
performing a plurality of parallel despreads using a PN sequence weighted with a plurality of weighting sequences; and
summing results of the plurality of parallel despreads to produce a sub-symbol.

9. An electronic apparatus comprising:
a despreader that despreads a received spread spectrum signal;
an interpolator coupled to the despreader, the interpolator interpolates a received data stream; and
an interpolation location controller coupled to the interpolator, the interpolation location controller determines a location for the interpolator in a despreader data-path.

10. The electronic apparatus of claim 9, wherein the interpolator performs chip-sample interpolation per antenna stream at a chip rate.

11. The electronic apparatus of claim 9, wherein the interpolator performs chip-sample interpolation per user at a chip rate.

12. The electronic apparatus of claim 9, wherein the interpolator performs symbol-sample interpolation per user at a sub-symbol rate.

13. The electronic apparatus of claim 9, wherein the interpolation location controller determines the interpolator location by considering a factor selected from the group consisting of number of users being serviced, channel type being received, the number of fingers to be despread, early-ontime-late processing, and spreading factor of received signal.

14. The electronic apparatus of claim 9, wherein the interpolation location controller increases the user capacity of a rake receiver by concurrently operating interpolators in a plurality of despreader data-path locations.

15. The electronic apparatus of claim 9, wherein the interpolation location controller increases the user capacity of a base station by dynamically locating the interpolator in the despreader data-path.

16. The electronic apparatus of claim 9, wherein the despreader performs a plurality of parallel despreads using a PN sequence weighted with a plurality of weighting sequences, and sums results of the plurality of parallel despreads to produce a sub-symbol.

17. An apparatus, comprising:
a processor; and
an interpolator software system configured to execute on the processor, the interpolator software system comprising an interpolation location controller and an interpolator, wherein the interpolation location controller determines a location for the interpolator in a despreader data-path, wherein the interpolator interpolates a received data stream.

18. The apparatus of claim 17, wherein the interpolator performs chip-sample interpolation per antenna stream at a chip rate.

19. The apparatus of claim 17, wherein the interpolator performs chip-sample interpolation per user at a chip rate.

20. The apparatus of claim 17, wherein the interpolator performs symbol-sample interpolation per user at a sub-symbol rate.

21. The apparatus of claim 17, wherein the interpolation location controller determines the interpolator location by considering a factor selected from the group consisting of number of users being serviced, channel type being received, the number of fingers to be despread, early-ontime-late processing, and spreading factor of received signal.

22. The apparatus of claim 17, wherein the interpolation location controller increases the user capacity of a rake receiver by concurrently operating interpolators in a plurality of despreader data-path locations.

23. The apparatus of claim 17, wherein the interpolation location controller increases the user capacity of a base station by dynamically locating the interpolator in the despreader data-path.

24. The apparatus of claim 17, further comprising a despreader coupled to the processor, the despreader performs a plurality of parallel despreads using a PN sequence weighted with a plurality of weighting sequences, and sums results of the plurality of parallel despreads to produce a sub-symbol.

* * * * *